United States Patent Office 3,250,817
Patented May 10, 1966

3,250,817
1,5-CYCLOOCTADIENE
Seymour J. Lapporte, Berkeley, Calif., assignor to Chevron Research Company, a corporation of Delaware
No Drawing. Filed June 17, 1963, Ser. No. 288,485
4 Claims. (Cl. 260—666)

This invention refers to an improved process for the production of 1,5-cyclooctadiene by the cyclodimerization of 1,3-butadiene in the presence of a catalyst under cyclodimerization conditions.

It is known in the art to cyclodimerize 1,3-butadiene thereby to produce 1,5-cyclooctadiene, but the processes suffer in a number of ways, included among which are the use of highly toxic heavy metal carbonyls, excessive amounts of costly catalyst ingredients, and relatively long reaction times, thereby necessitating the use of large batch-type equipment, as contrasted with the well-known advantages possible in the use of continuous-type process equipment.

It has now been found that 1,5-cyclooctadiene may be efficiently produced in an improved catalytic process in which 1,3-butadiene is contacted under cyclodimerization conditions in the presence of a catalytic amount of a cyclodimerization catalyst obtained by the reaction of:

(a) One formula weight of a metal hydrocarbonate of the formula $M(O_2CR)_n$;
(b) From about 2.5–4.5 moles of a hydrocarbyl-aluminum compound of the formula $AlR'_3$; and
(c) From about 0.5–3.0 moles of a trivalent phosphorus compound of the formula $PR''_3$;

wherein said metal, M, having a known valence, $n$, has an atomic number in the range 27–28, inclusive, R of said hydrocarbanoate salt radical is a stable hydrocarbyl radical having from 6–35 carbon atoms per radical group, R' of said trihydrocarbyl aluminum is a stable hydrocarbyl radical of from 1–20 carbon atoms per group, and wherein said R'' is selected from the group consisting of stable hydrocarbyl radicals having from 1–20 carbon atoms per radical group, and hydrocarboxy groups, the stable hydrocarbyl component of which has from 1–20 carbon atoms per group, and recovering the resulting 1,5-cyclooctadiene.

1,3-butadiene and methyl substituted 1,3-butadienes are cyclodimerized by the novel catalyst of the present invention.

Cyclodimerizations of 1,3-butadiene conducted in the presence of the foregoing catalyst system readily result under approximately optimum cyclodimerization conditions, for example at a temperature of the order of 130° C. and reduced, atmospheric, and autogenous pressures, in substantially quantitative conversion of butadiene in a reaction period of 0.3 hour and less. Under these conditions, the yield of 1,5-cyclooctadiene is excellent, being of the order of 75% and higher.

In the use of the catalyst of the present invention under preferred cyclodimerization conditions, that is reaction temperatures in the range from about 0–150° C., autogenous pressure, and an inert atmosphere.

By the use of the term stable is meant that little or no interfering interaction between the catalyst components and feed occur incidental to the nature of the particular radical group and the catalytic cyclodimerization activity.

Representative metal hydrocarbanoate salts are the nickel and cobalt salts of 2-ethylhexanoic, cyclohexanecarboxylic, benzoic, toluic, naphthenic, undecanoic, oleic, stearic, 4-t-butylbenzoic, 2-phenylpropionic, α-naphthoic, 3 - cyclohexenecarboxylic, dodecanoic, 2 - methylhexadecanoic, 2-methylundecanoic, 2-methyloctanoic, and the like acids; that is, the hydrocarbyl radical attached to the carboxylate group may have from 6 to 35 carbon atoms, including alkyl, cycloalkyl, alkylaryl, alkenyl, and mono- and polynuclear aromatic hydrocarbon groups. Nickel carboxylate salts having from 6 to 35 carbon atoms per carboxylate anion group are preferred.

Representative trihydrocarbyl aluminum compounds are triethyl aluminum, triisobutyl, triphenyl, trihexadecyl, trimethyl, tri-n-$C_{20}H_{41}$, diethylphenyl, and the like aluminum compounds having from 1 to 20 carbon atoms per radical group. Low molecular weight stable trihydrocarbyl aluminum compounds are preferred for reasons of economy.

Representative classes of trivalent phosphorus compounds are the trihydrocarbyl phosphines and the trihydrocarbyl phosphites having from 1 to 20 carbon atoms per hydrocarbyl group, of which triphenyl phosphine and triphenyl phosphite are preferred compounds. Other phosphines include triethyl, trioctyl, trinaphthyl (α and β), tri 4-t-butylphenyl, tricyclohexyl, diphenylethyl, and the like phosphines. Hydrocarbyl groups of the phosphines and phosphites which are sterically bulky are preferred. Other phosphites are those where the hydrocarbyl groups are analogous to the phosphine hydrocarbyl groups listed above. Similarly, and in general, the hydrocarbyl radical types within indicated molecular weight ranges specified are intended to be analogous for all components of catalyst described above, and, for this reason, repetitive and extensive listings of representative compounds for each catalyst component are not made nor believed to serve a useful purpose.

The reactants and reaction system of the present process must be essentially anhydrous and free of molecular oxygen and foreign acidic materials.

The examples following are given for purposes of illustration, and it is to be understood that the invention is not to be limited to the specific conditions or details set forth, but only insofar as such limitations are specified in the appended claims.

EXAMPLES 1–9

In these runs, the catalyst and medium, usually about 20 ml., were charged to a 250 ml. stainless steel Magnedash autoclave which had been thoroughly dried. The sealed autoclave was then pressured with dry nitrogen and vented several times, resulting for practical purposes in an oxygen-free atmosphere in the autoclave. The desired amount of butadiene was then charged to the autoclave, which was then brought to the desired temperature and held there for the indicated reaction periods. The reaction product workup and recovery was accomplished in a conventional manner. Analyses were carried out using vapor-phase chromatographic techniques and the appropriate standards. In this manner, the data of Table I following was obtained.

| Run No | 1[1] | 2 | 3 | 4 | 5 | 6 | 7[2] | 8[2] | 9[3] |
|---|---|---|---|---|---|---|---|---|---|
| Ni 2-ethylhexanoate, moles | | 0.005 | 0.005 | 0.005 | 0.005 | 0.005 | 0.005 | 0.005 | 0.005 |
| Triethyl aluminum, moles | | 0.015 | | 0.015 | 0.015 | 0.015 | 0.015 | 0.015 | 0.015 |
| Electron donor | | | $\phi_3P$ | $\phi_3P$ | $\phi_3P$ | $\phi_3P$ | $(\phi O)_3P$ | $(\phi O)_3P$ | $(\phi O)_3P$ |
| Mole electron donor | | | 0.015 | 0.015 | 0.015 | 0.005 | 0.010 | 0.010 | 0.010 |
| Solvent | Toluene | Pentane | Pentane | Pentane | Pentane | Pentane | Benzene | Benzene | Benzene |
| Butadiene, moles | 1.55 | 1.48 | 1.65 | 1.68 | 1.68 | 1.8 | 1.45 | 1.39 | 1.41 |
| Temperature, °C | 135.0 | 130.0 | 130.0 | 130–140 | 80.0 | 130.0 | 130.0 | 130.0 | 130.0 |
| Reaction time, Hrs | 15.5 | 8.0 | 18.5 | 0.3 | ~7.0 | 0.5 | 18.0 | 3.0 | 3.0 |
| Conversion | 57.0 | 98.0 | 51.0 | 98.0 | 100.0 | 97.0 | 36.0 | 95.0 | 96.0 |
| Yield C$_8$ and C$_{12}$, percent | 94.0 | 89.0 | 76.0 | ~100.0 | ~100.0 | 95.0 | ~95.0 | 88.0 | 87.0 |
| Selectivity, percent: | | | | | | | | | |
| C$_8$, Acrylic | | | 5.6 | | | 0.4 | 4.8 | | |
| 4-vinylcyclohexene | 96.3 | 11.4 | 91.9 | 21.0 | 27.0 | 19.2 | 92.8 | 22.6 | 20.7 |
| 1,5-cyclooctadiene | 3.0 | 6.0 | 2.5 | 73.8 | 69.9 | 68.0 | 2.0 | 76.7 | 78.5 |
| Cyclododecatriene | 0.8 | 82.0 | | 5.2 | 3.1 | 11.8 | 0.3 | 0.8 | 0.8 |

[1] Thermal reaction.
[2] 1.0 gram CaC$_2$ added.
[3] 1.0 gram CaC$_2$, 0.030 dicyclopentadiene added.

For these data it is to be seen that the relative amount of trihydrocarbyl aluminum compound (moles) to the nickel hydrocarbanoate salt (formula weight) is critical in the present catalyst system. Thus, in comparing Runs 7 and 8, analogous except for relative amounts of the aluminum alkyl component, the use of excessive relative amounts, for example 16 moles of the aluminum alkyl component per formula weight of salt, results in the little or no catalytic cyclodimerization activity. On the other hand, when the ratio is 3:1, respectively (cf. Run 8 and particularly Run 4), an effective catalyst results and reaction rates are high.

Similarly, and considering relative amounts of the trivalent phosphorus component, when none is used (cf. Runs 1 and 2), only about that amount of 1,5-cyclooctadiene results as may be expected from a thermal uncatalyzed reaction. On the other hand, when a 1:1 relative ratio of the phosphorus compound component to trialkyl aluminum component is used (cf. Run 6), an effective 1,3-butadiene cyclodimerization catalyst results. Where the ratio is as high as 3:1 (cf. Runs 4 and 5), there is no marked improvement in catalyst performance. Therefore, the use of larger amounts would be impracticable and undesirable.

The added calcium carbide in Runs 7, 8, and 9 was included as a scavenger for traces of hydrolysis impurities suspected present in the feed used.

When cobalt is substituted for nickel in comparable runs, 1,5-cyclooctadiene is produced, but the yields and conversions are, in general, lower than where nickel is employed.

This invention has been described with particular reference to preferred embodiment thereof; nevertheless, it will be understood that variations of these embodiments can be effected without departing from the inventive concept.

I claim:
1. In a process for the production of 1,5-cyclooctadiene in a reaction zone at a temperature in the range from about 0 to 150° C., under an inert atmosphere and autogenous pressure by contacting butadiene with a cyclodimerization catalyst, the improvement which comprises effecting said cyclodimerization by the catalyst obtained from the reaction of:

(a) One formula weight of metal carboxylate of the formula $M(O_2CR)_n$;
(b) From about 2.5 to 4.5 mols of a hydrocarbyl aluminum compound of the formula $AlR'_3$; and
(c) From about 0.5 to 3.0 mols of a trivalent phosphorus compound of the formula $PR''_3$;

wherein said metal, M, having a known valence, $n$, has an atomic number in the range 27 to 28, inclusive, R of said carboxylate salt radical is a stable hydrocarbyl radical having from 6 to 35 carbon atoms per radical group, R' of said trihydrocarbyl aluminum is a stable hydrocarbyl radical of from 1 to 20 carbon atoms per group, and wherein said R" is selected from the group consisting of stable hydrocarbyl radicals having from 1 to 20 carbon atoms per radical group and hydrocarboxy groups, the stable hydrocarbyl component of which has from 1 to 20 carbon atoms per group.

2. Process of claim 1 wherein said metal is nickel, said trihydrocarbyl aluminum compound is triethyl aluminum, and said trivalent phosphorus compound is triphenyl phosphine or triphenyl phosphite.

3. Process of claim 1, wherein said 1,3-butadiene is methyl substituted.

4. Process of claim 1 wherein said dimerization is carried out in an inert hydrocarbon diluent.

References Cited by the Examiner

FOREIGN PATENTS 219,580   2/1962   Austria.
917,103   1/1963   Great Britain.

DELBERT E. GANTZ, *Primary Examiner.*

PAUL M. COUGHLAN, *Examiner.*

V. O'KEEFE, *Assistant Examiner.*